United States Patent [19]

Ambadar et al.

[11] Patent Number: 5,672,250
[45] Date of Patent: Sep. 30, 1997

[54] SEAWATER SOLAR DESALINATION SYSTEM

[76] Inventors: Husein Ambadar; Zantar Ambadar; Zeky Ambadar, all of Seuseupan 13 Ciawi, Bogor, Indonesia

[21] Appl. No.: 521,431

[22] Filed: Aug. 30, 1995

[51] Int. Cl.$^6$ ............................. B01D 3/00; B01D 3/42
[52] U.S. Cl. ..................... 202/169; 202/185.1; 202/234; 203/10; 203/DIG. 1; 203/DIG. 14; 203/DIG. 17
[58] Field of Search .......................... 202/168, 169, 202/185.1, 234; 203/10, DIG. 17, DIG. 1, DIG. 14; 159/903; 126/271, 270

[56] References Cited

U.S. PATENT DOCUMENTS

| | | | |
|---|---|---|---|
| 1,544,029 | 6/1925 | Nelson | 202/152 |
| 3,138,546 | 6/1964 | Muller | 202/205 |
| 3,257,291 | 6/1966 | Gerber | 202/234 |
| 3,338,797 | 8/1967 | Hermansen | 202/190 |
| 3,359,183 | 12/1967 | Kenk | 203/10 |
| 3,785,931 | 1/1974 | Coffey et al. | 202/234 |
| 4,053,368 | 10/1977 | Courvoisier et al. | 203/10 |
| 4,135,985 | 1/1979 | La Rocca | 202/176 |
| 4,151,830 | 5/1979 | Crombie et al. | 126/271 |
| 4,276,122 | 6/1981 | Synder | 202/234 |
| 4,421,606 | 12/1983 | Tsumura et al. | 203/10 |
| 4,459,177 | 7/1984 | O'Hare | 203/10 |
| 4,478,685 | 10/1984 | Mortenson | 202/158 |
| 4,504,362 | 3/1985 | Kruse | 203/3 |
| 4,521,276 | 6/1985 | Tsumura et al. | 159/1 |
| 5,282,979 | 2/1994 | Wilson | 210/774 |

OTHER PUBLICATIONS

Kompas daily newspaper, Dec. 3, 1978, "Ambadar Pump", 2 pages, with Translation.
Tempo Magazine, Dec. 9, 1978, "Pump from Ciawi", 2 pages, with Translation.

*Primary Examiner*—Nina Bhat
*Attorney, Agent, or Firm*—Jacobson, Price, Holman & Stern, PLLC

[57] ABSTRACT

A solar seawater desalination system is designed to operate in a self-sustaining manner without the need for any moving parts. Seawater is converted to steam in a solar heat collector panel and the steam is led in a steam pipe through a series of primary cooling chambers where it is condensed by incoming seawater in tanks jacketing the steam tube. The tanks are connected in series between an inlet air-lock regulator and the solar collector panel so that the seawater is caused to flow successively through the tanks from the inlet to the collector panel as make-up water, solely by pressure differentials created in the system by the steam generation. Excessively saline seawater which collects in the collector panel is dumped from the system in a similar manner through an outlet air-lock regulator. Secondary cooling chambers may be provided to condense steam generated from the seawater in the primary cooling chambers by heat received from the steam pipe.

8 Claims, 4 Drawing Sheets

SEAWATER SOLAR DESALINATION SYSTEM

FIELD OF THE INVENTION

This invention relates to a solar desalination or distillation system, particular for the desalination of seawater and referred to hereinafter for simplicity, as a solar desalination system.

In barren areas of the earth which suffer from low rainfall, there is a continuing need to distill non-potable water such as seawater. Fortunately, such areas of the earth commonly have an abundance of sunshine an accordingly solar desalination of seawater, in such areas, would be appropriate.

SUMMARY OF THE INVENTION

It is an object of the invention to provide a reliable solar desalination system for seawater and the like, suitable for on-site installation, which can operate to distill seawater continuously during suitable conditions of sunlight with no manual attention or intervention required.

Another object of the invention is to provide a solar desalination system as described which functions with minimal operating costs.

Still another object of the invention is to provide a solar desalination system having a simplified construction with no moving parts.

The invention uses a solar collector panel which, in a preferred embodiment, comprises an array of parallel inclined glass tubes arranged on a reflector panel housed on a concrete or like base. The tubes are partially filled with seawater (or other water to be distilled) so that, when subjected to suitable conditions of sunlight, the seawater will boil and form steam at the top of each tube.

The tops of the collector panel tubes are connected, thorough suitable mainfolding, to a steam flow pipe which passes through at least one, and in practical embodiments, a series of primary cooling chambers in which the steam is condensed. The condensed steam is collected as fresh water in a fresh water container below the primary cooling chambers.

The steam piping is cooled in each primary cooling chamber by incoming raw seawater which flows in series through the primary cooling chambers in counterflow to the flow of steam. The seawater flows from a raw seawater inlet into the last primary cooling chamber and from the first primary cooling chamber into the bottom of the solar collector panel.

Contaminated seawater is dumped from the base of the solar collector panel through a seawater outlet. The seawater inlet and outlet each include a flow regulator air-lock comprising a serpentine arrangement of vertically disposed tubes. Seawater flow through the system is produced by pressure differentials created by converting the seawater to steam in the solar collector panel.

For systems where seawater flowing through the primary cooling chambers is itself converted into steam (by heat flow from steam coming from the collector panel) each primary cooling chamber is placed in steam flow communication with a parallel secondary cooling chamber where such steam is condensed, and collected in the same or another fresh water container. The secondary cooling chambers may comprise air-cooled glass tubes or may themselves be cooled by the incoming seawater in series flow with the primary cooling chambers.

Additional features and advantages of the invention will become apparent from the ensuing description and claims read in conjunction with the attached drawings.

DETAILED DESCRIPTION OF THE PREFERRED EMBODIMENTS

Figure 1:
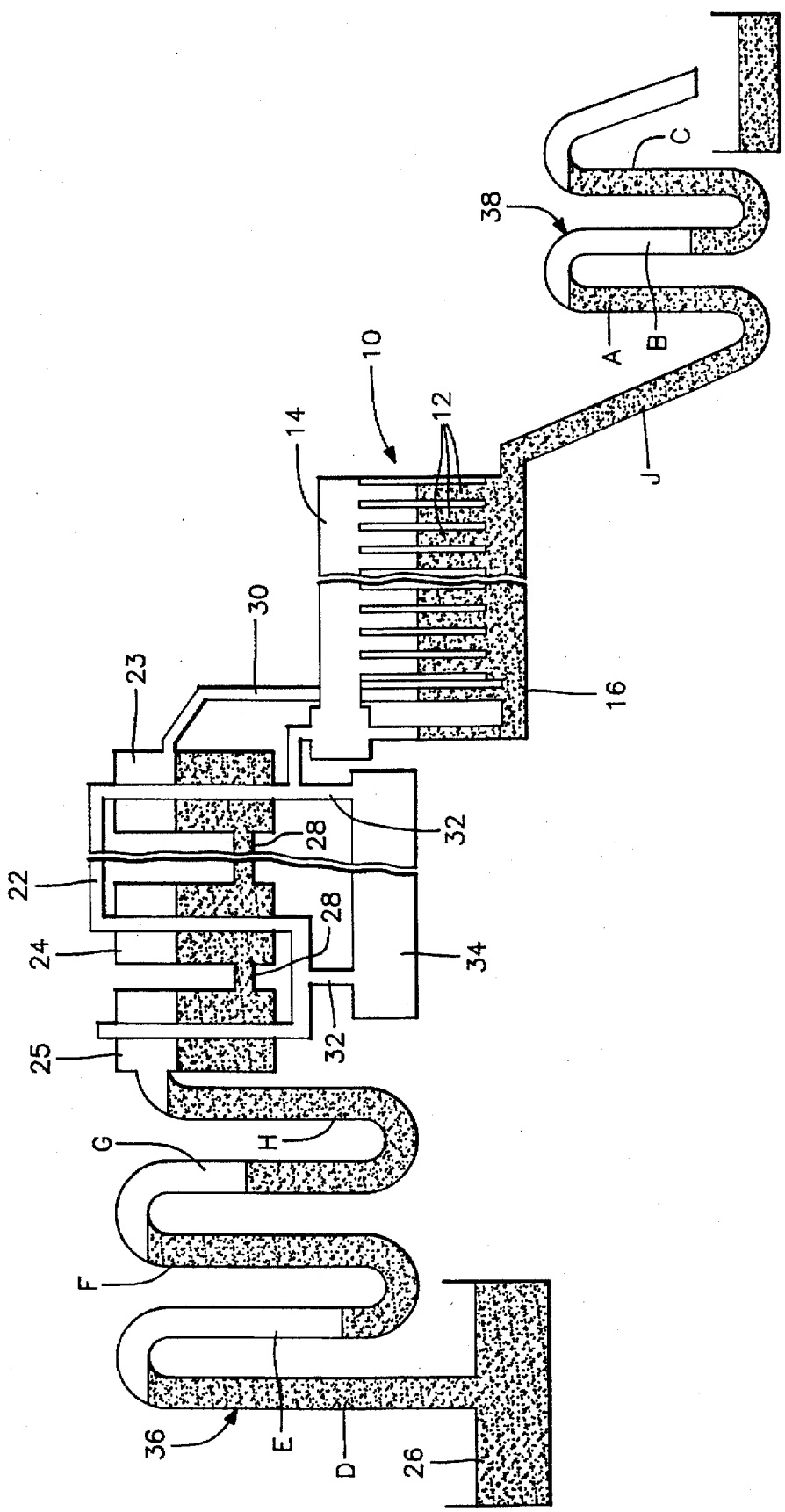
FIG. 1 is a diagrammatic view of a first embodiment solar desalination system according to the invention.
Figure 2:
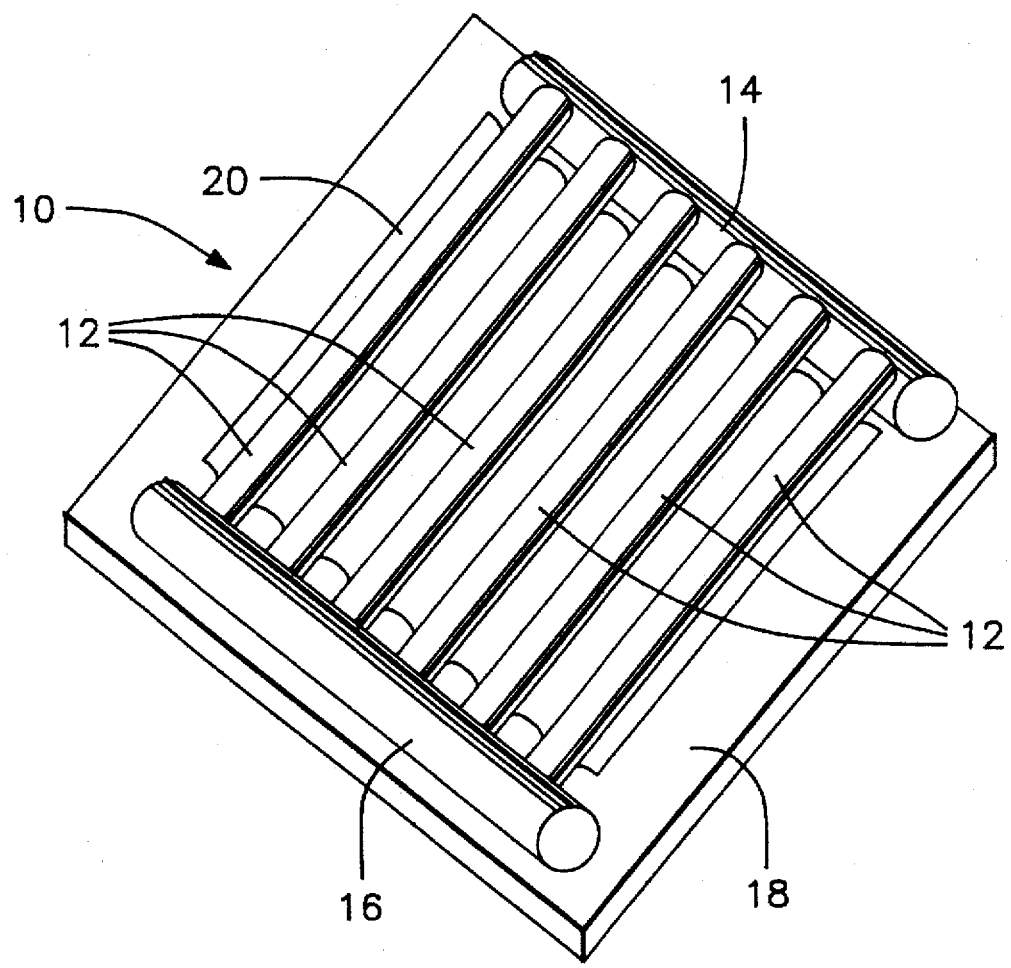
FIG. 2 is a perspective view of a solar collector panel used in the system.
Figure 3:
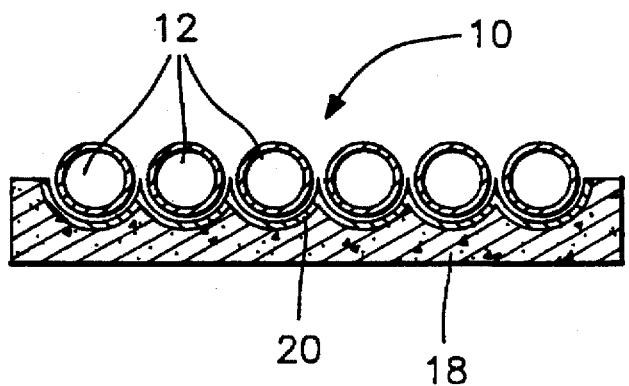
FIG. 3 is a cross-sectional view through the solar collector panel.

Referring initially to FIG. 1, the first embodiment solar desalination system comprises a solar collector panel 10, shown in more detail in FIGS. 2 and 3 in which seawater (or other water to be distilled) is converted to steam by solar radiation. The collector panel comprises a plurality of parallel glass tubes 12 with upper and lower manifolds 14, 16, the tubes being fitted in a concrete, cement or other base 18 and being inclined upwardly. A wave-like stainless steel reflector panel 20 is located between the tubes and the base and gaps may be filled with foam or sand.

In use, with the tubes 12 filled part-way up with seawater, as seen in FIG. 1, under the influence of sunlight, intensified by the reflector 20, the seawater boils and creates steam in the top of the tubes and upper manifold 14. From mainfold 14, the steam flows in a steam pipe 22 through a succession of primary cooling chambers 23–25. In the illustrated embodiment there are three cooling chambers but this number may be increased or decreased depending on outside conditions. The number of cooling chambers is selected so as to provide complete condensation of all the steam. Each cooling chamber comprises an outer tank, of suitable metal or plastic jacketing steam pipe 22, and the pipe is cooled in each chamber by raw incoming seawater received from a seawater inlet 26 and flowing successively in counterflow through the cooling chambers and hence into the solar collector panel to provide make-up seawater. Seawater connections 28 are provided between the bottoms of the respective cooling chambers and make-up seawater is delivered from the top of the first cooling chamber 23 to the bottom of the solar collector panel through a make-up pipe 30. Steam which is condensed in pipe 22 in the respective cooling chambers is fed by gravity to a fresh water container 34 through pipes 32 branched off from pipe 22.

Raw seawater from inlet 26 is delivered to the system through an inlet air-lock regulator 36 comprising a serpentine arrangement of vertical piping or U-tubes leading into the top of the last cooling chamber 25. Excessively saline spent seawater is dumped from the system through a similar outlet air-lock regulator 38 also comprising a serpentine arrangement of vertical tubes below the bottom of the collector panel 10 and connected with the bottom mainfold 16. Seawater is drawn through the system from the inlet 26 through the cooling chambers, collector panel and outlet 38 by pressure differentials that are created by the production of steam in the collector panel and as will be described in more detail below.

When the collector panel is heated, thus creating steam which flows through pipe 22 becomes condensed, the equivalent decrease in water quantity in the collector panel causes air pressure inside the collector panel to become lower than air pressure inside the primary cooling chambers.

The higher air pressure inside the first primary cooling chamber 23 will thus push the water column in the connecting pipe 30 toward the collector panel to balance its pressure. The pressure in chamber 23 becomes lower than the pressure in chamber 24 and seawater is thus transferred from chamber 24 to chamber 23. This process is continued down the line of cooling chambers as a chain reaction. When the water level in chamber 23 rises, it spills over into the collector panel through pipe 30.

Since air pressure in the last primary cooling chamber 25 which is connected to the regulator 36 also becomes lower than the pressure of air trapped in the air-lock piping of the regulator, water will also spill over from the regulator into the last cooling chamber and raw seawater will also be sucked into the system at the inlet 26. The process is continuous as long as evaporation and condensation take place.

As the seawater in the collector panel evaporates into steam, the specific gravity of the seawater increases due to its increasing salt concentration. While the water level in the collector panel generally stays the same, its higher specific gravity will cause water in the first glass tube A of the outlet regulator 38 to spill over to the second tube B. This in turn will cause the water level in the third glass tube C to increase, so that water will spill over and be discharged from the outlet. The system is thus based on the Bernuoulli principle. The number and length of glass tubes in the outlet regulator will depend on the level of salt concentration required in the outlet water. The process is also assisted by the dynamic movement of boiling water in the collector panel acting on the water column.

To prime the system for the first time, the primary cooling chambers and glass tubes 12 of the collector panel are partially filled with seawater as will be described in more detail below. Once the system has been primed it becomes fully operational and self-sustaining under sunshine conditions which are sufficient to continue the creation of steam in the collector panel.

Figure 4:
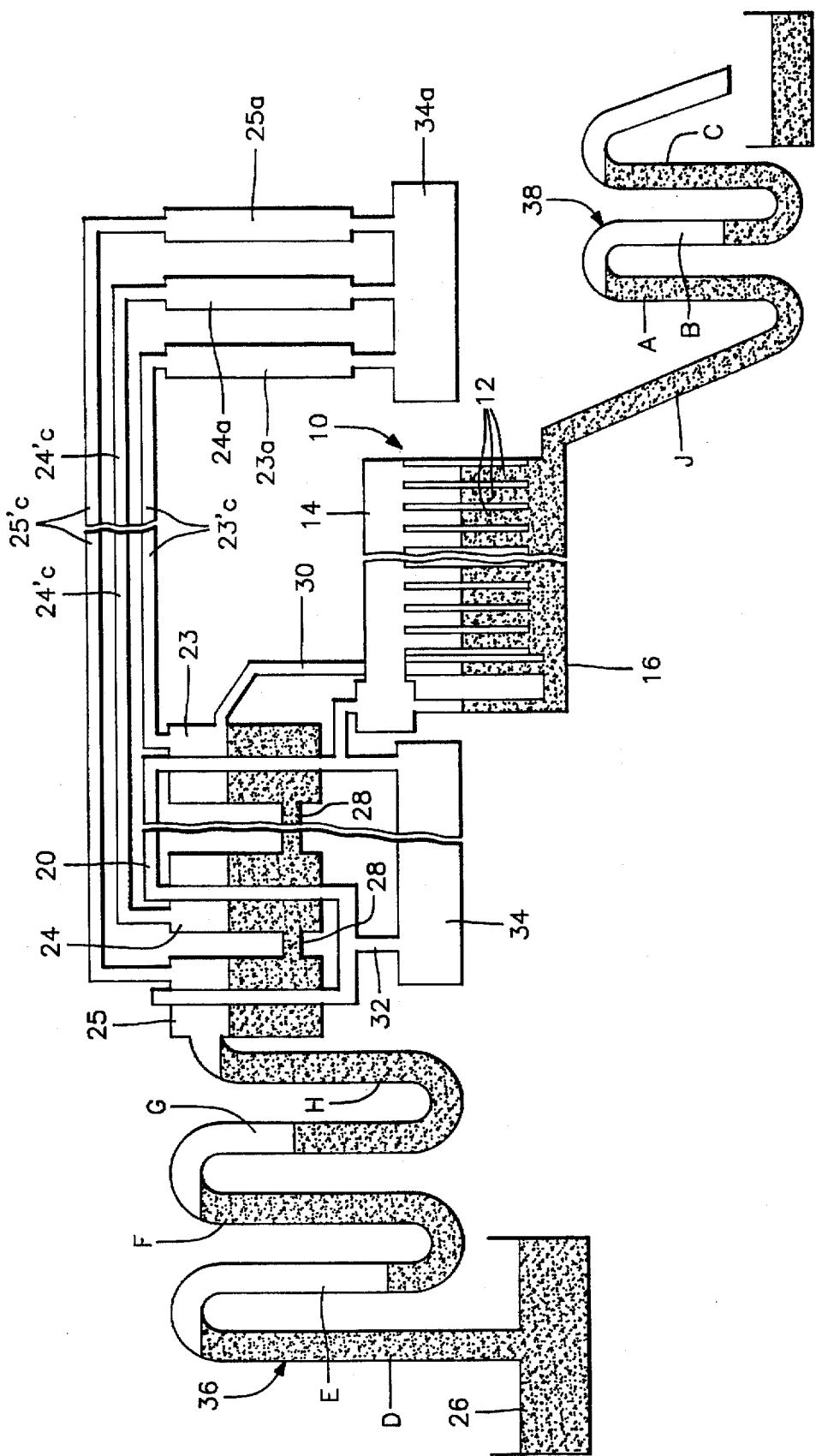
FIG. 4 is a diagrammatic view of a second embodiment system according to the invention.

It is possible that heat transferred to the seawater in the primary cooling chambers by the condensing steam may be sufficient to boil the seawater in the primary chambers thus creating additional steam in the primary cooling chambers. FIG. 4 shows a second embodiment of the invention in which the top of each primary cooling chamber 23, 24, 25 is connected to a secondary cooling chamber 23a, 24a, 25a via similar steam tubes 23c, 24c, 25c so that the secondary steam can itself be condensed in the secondary cooling chambers. Condensed steam from the secondary cooling chambers can be collected in fresh water tank 34 or in a second fresh water tank 34a. In FIG. 4, each secondary cooling chamber is in the form of a vertical air-cooled glass tube.

Figure 5:
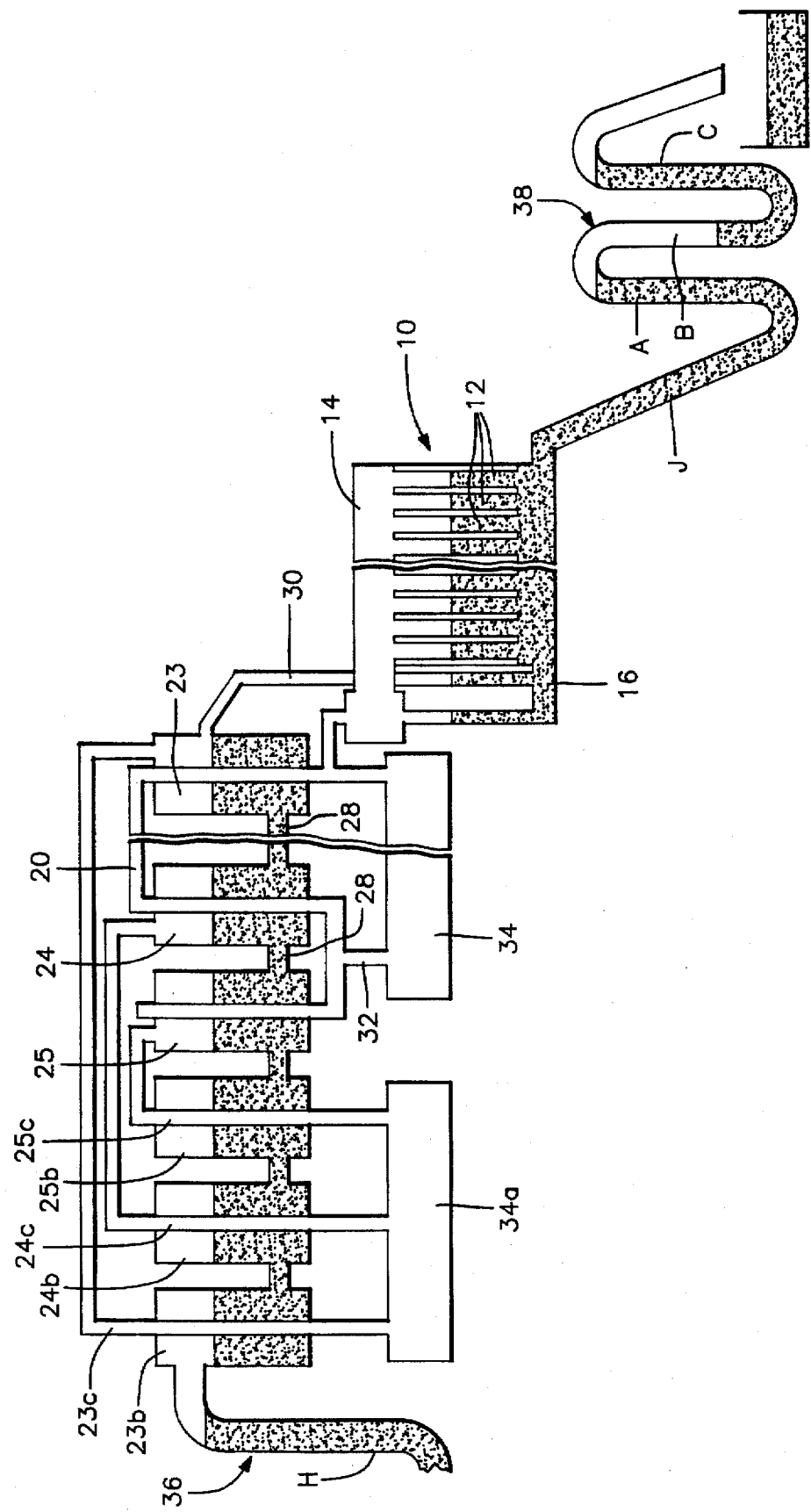
FIG. 5 is a diagrammatic view of a third embodiment system.

FIG. 5 shows an alternative embodiment wherein each secondary cooling chamber 23b, 24b, 25b is of similar form to the primary cooling chambers comprising a seawater tank jacketing the respective steam tube 23c, 24c, 25c. In this embodiment the secondary cooling chambers are connected in parallel to the respective primary cooling chambers for steam flow, but are connected in series with the primary cooling chambers for seawater flow. Effectively, seawater flows from the inlet regulator 36 in series through the respective secondary cooling chambers, then in series through the respective primary cooling chambers, into the heat collector panel and then with increased salt concentration out through the regulator 38. If still further steam is generated in the secondary cooling chamber, each secondary cooling chamber can be connected to a tertiary cooling chamber, etc., etc.

For a more detailed explanation of how the air locks in the inlet and outlet regulators 36 and 38 are formed and how the system operates in general, reference is made to FIG. 4.

1. Inlet air-lock regulator 36. To first fill the system, seawater is pumped slowly through the 1st inlet tube D. When the water level reaches the top of the 1st tube, it will flow down the 2nd tube E and fill the bottom of the 2nd and 3rd tubes E and F leaving trapped air inside the 2nd tube E. The water level inside the 2nd and 3rd tubes will rise, but it will be higher inside the 3rd tube F due to trapped air pressure built up inside 2nd tube E. After reaching the top of the 3rd tube F, water will flow down the 4th tube and again trapped air will be formed inside the 4th tube, etc. When seawater fills the last inlet tube H that is connected to primary cooling chamber 25, it will fill the primary cooling chambers. Trapped air pressure built up inside the primary chambers due to the rise of water level, is released through the secondary cooling chambers by opening an outlet (not shown) in fresh water container 34a.

2. Outlet air-lock regulator 38. When the pumped seawater reaches the top pipe outlet in the first primary cooling chamber 26, it will fill the solar collector panel and also the 1st and 2nd outlet tubes J and A. It will then flow through and form trapped air inside the 3rd, 5th, 7th tubes etc. of the outlet regulator only the 3rd tube B being shown in FIG. 4. Water level inside the collector panel will rise, and trapped air pressure built up inside the panel is released through the steam pipes and fresh water container outlet. The number and length of outlet tubes in regulator 38 is designed to have water spill from the last outlet tube when the water level almost reaches the top of the glass tubes inside the solar collector panel.

3. When water is spilled out, as above, the fresh water container outlet is closed, the pump shut off and disconnected from the 1st inlet tube D which remains inside the seawater source. At this point, there will be a reverse flow of water inside the inlet tubes D–H due to slightly higher trapped air pressure than outside air. The length and number of inlet tubes is designed to minimize the reverse flow, so that when the first static balanced condition is reached, even though there are trapped air columns inside the top of the 1st, 3rd, 5th tubes D, F, H etc., the length of its column is shorter than the length of water column inside the bottom of the 2nd, 4th, tubes E, G etc.

The air locks will be maintained as long as no air column moves across from the 2nd to 3rd tube, 4th to 5th tubes etc. for the inlet tubes, or from 3rd to 4th tube, 5th to 6th tubes etc. for the outlet tubes.

During operation of the system, when air pressure inside the cooling chambers and collector panel drops due to condensation and decrease of the water level, an unbalanced condition is created inside the system. For first time operation, the effects of this condition are:

1. Inlet regulator tubes. The water column inside the 2nd, 4th, tubes E, G etc. will be pushed down by trapped air trying to expand, and the water level inside the 3rd, 5th, tubes F, H etc. will rise. The drop of trapped air pressure inside the 2nd tube due to its expansion, will cause the water level inside 1st tube D to rise. It is essential for water inside 1st, 3rd, 5th tube etc. to reach the top of each tube and spill over into the next tube while there is a water column inside 2nd, 4th, 6th tube etc. so that trapped air cannot move across to the next tube. This condition is achieved if the length of air column inside the tops of the odd number tubes is shorter than the length of water column inside the bottoms of the adjacent tubes.

2. Outlet regulator tubes. First there will be a reverse flow in the outlet tubes to compensate for the pressure drop and decreasing water level in the collector panel. The reverse flow is slight because the increase of specific gravity of the seawater due to evaporation will tend to balance it, and trapped air columns form on top of the 2nd, 4th, 6th tubes etc. e.g., tubes A, C etc. Continued increase of the seawater specific gravity while the water level inside the collector panel ceases to decrease due to water replacement from the first primary cooling chamber, will cause the water level inside the 2nd tube A to rise. In turn the water column inside the 3rd, 5th, 7th tube etc. will be pushed down, and inside the adjacent tubes will rise. To keep the trapped air from moving across through the bottom of the tubes, the system is designed so that water that rises will reach the top of a tube and spill over to the next tube while there is water column in each adjacent tube, except the last tube. After the system reaches equilibrium and operates normally, water levels inside the 1st, 3rd, 5th inlet tubes D, F, H etc. have reached the tops of the tubes, water levels inside the cooling chambers and collector panel will only differ slightly, because a small pressure drop will trigger water flow inside each inlet tube to refill it. There are thus frequent pressure differentials and frequent refills to balance them, each of small magnitude. With these conditions, the trapped air-locks inside the inlet tubes will stay stable in place, frequently expanding and contracting slightly, pumping water to the cooling chambers and sucking it from the water source. The salt concentration that is gradually increased in the collector panel, will cause salt-laden water to slowly spill over in the outlet tubes. This flow is also helped by the dynamic movement of boiling water that creates frequent, slight pushes down that causes small contractions and expansions of trapped air in the outlet tubes.

In Summary:

1. Trapped air pockets are formed in the inlet and outlet tubes by initially pumping seawater through the 1st inlet tube. The amount of trapped air depends on the rate of water flow. If the rate is too fast, there may not any trapped air, and if too slow the air volume will be too big. The aim is to have the length of a trapped air pocket about half a tube's length.

2. When the first static balanced condition is reached, the length of a trapped air column in the top of each tube should be shorter than the length of water column in the bottom of an adjacent tube. This will occur if trapped air pressure is only slightly higher than outside air pressure when seawater is pumped to the system. When the reverse flow stops, and from then on, air pressure inside the entire system is less than outside air pressure.

3. To keep the trapped air from slipping over to the next tube, the rising water must reach its top and spill over while there is water column inside each adjacent tube.

4. The trappped air pockets will stay stable in place during continuous operation because frequent, slight pressure differentials in the system will only create small contractions and expansions of the trapped air volumes.

As an example of the workings of the invention, applicants have constructed a system of the kind shown in FIG. 4 of the drawings. In the example as constructed, there are 23 glass tubes in the solar collector panel, each tube being 189 inches long and 1.25 inches diameter. There are 44 primary cooling chambers each 38 inches long and 4 inches in diameter. The diameter of the steam tube around which the primary cooling chambers are jacketed is 1.25 inches. The secondary glass-tube cooling chambers are each 47.25 inches long and 1.25 inches diameter. The inlet and outlet air-lock regulators each comprise 12 vertical tubes connected in serpentine manner each tube being 23.75 inches long and 1.25 inches diameter. The panel is initially filled and operates with about 12 gallons of seawater and there is about 16 gallons of seawater in the cooling chambers and regulators. With moderate sunshine the system produces about 1.5 gallons of fresh water per hour.

The invention thus provides a simple self-sustaining solar desalination system having no moving parts. While only preferred embodiments of the invention have been described in detail, the invention is not limited thereby and modifications are possible within the scope of the detailed claims.

We claim:

1. A solar desalination or distillation system comprising a solar heat collector panel for receiving tainted water and converting the tainted water into steam by solar radiation, a steam flow pipe leading out from the heat collector panel, primary cooling chamber means in heat exchange relation with the steam flow pipe for condensing steam flowing from the heat collector panel into fresh water, a fresh water tank connected to a bottom section of the steam flow pipe for receiving condensate from the steam flow pipe by gravity flow, the primary cooling chamber means comprising at least one water tank jacketing the steam flow pipe, said cooling chamber means having an inlet end and an outlet end, said inlet end connected to inlet air-lock regulator piping for introducing raw tainted water into the system, said outlet end being connected to the heat collector panel for delivering make-up tainted water to the heat collector panel and outlet air-lock regulator piping connected to an extending below the heat collector panel for discharging excessively tainted water collected in the heat collector panel, whereby tainted water is caused to flow from the inlet air-lock regulator piping, through the primary cooling chamber means, to the heat collector panel and through the outlet air-lock regulator piping by pressure differentials created in the system by generation of steam in the heat collector panel, wherein said inlet air-lock regulator piping and said outlet air-lock regulator piping each comprises a plurality of vertically extending tubes interconnected in a serpentine arrangement for the formation of alternating water columns and air-lock pockets therein.

2. A system as claimed in claim 1 wherein the heat collector panel comprises a plurality of parallel upwardly inclined tubes connected into upper and lower manifold means wherein the steam pipe issues from the upper manifold means, wherein the outlet end of the cooling chamber means is connected to the lower manifold means and wherein the outlet air-lock regulator piping extends from the lower manifold means.

3. A system as claimed in claim 2 including a reflector sheet behind said tubes for intensifying solar radiation transmitted to the tubes.

4. A system as claimed in claim 1 wherein the primary cooling chamber means comprises a plurality of water tanks interconnected in series and jacketing adjacent upright sections of the steam pipe, adjacent bottom sections of the steam pipe being connected to the fresh water tank by respective branch pipes and the tainted water being adapted to flow successively through said water tanks from the inlet air-lock regulator piping to the heat collector panel in counter flow to the direction of steam flow in the steam pipe.

5. A system as claimed in claim 1 including secondary cooling chamber means connected to the primary cooling chamber means for condensing steam generated from tainted water in the primary cooling chamber means by heat received from the steam pipe.

6. A system as claimed in claim 5 wherein the secondary cooling chamber means comprises an air-cooled pipe connected to an upper part of said at least one water tank and a condensate collector tank connected to said air-cooled pipe.

7. A system as claimed in claim 5 wherein said secondary cooling chamber means comprises a steam tube extending from an upper portion of said at least one water tank, another water tank jacketing said steam tube and a condensate receiving tank connected to said steam tube wherein said another water tank is connected in water flow communication in series between said inlet air-lock regulator piping and said at one water tank.

8. A system as claimed in claim 1 wherein said inlet air-lock regulator piping and said outlet air-lock regulator piping each comprises at least three of said vertically extending tubes.

* * * * *